(12) United States Patent
Frisch

(10) Patent No.: US 6,178,687 B1
(45) Date of Patent: Jan. 30, 2001

(54) INSECT TRAP

(75) Inventor: Steven Frisch, Brooklyn, NY (US)

(73) Assignee: Atlantic Paste & Glue Co., Inc., Brooklyn, NY (US)

( * ) Notice: Under 35 U.S.C. 154(b), the term of this patent shall be extended for 0 days.

(21) Appl. No.: 09/156,924

(22) Filed: Sep. 18, 1998

Related U.S. Application Data

(60) Provisional application No. 60/059,410, filed on Sep. 19, 1997.

(51) Int. Cl.$^7$ .................................................. A01M 1/14
(52) U.S. Cl. .............................. 43/114; 43/115; 43/116
(58) Field of Search ............................... 43/115, 116, 117

(56) References Cited

U.S. PATENT DOCUMENTS

| | | | |
|---|---|---|---|
| 537,060 | * | 4/1895 | Mitchamore ........................... 43/114 |
| 610,107 | * | 8/1898 | Thum ..................................... 43/114 |
| 610,109 | * | 8/1898 | Thum ..................................... 43/114 |
| 878,268 | * | 2/1908 | Bayer ..................................... 43/114 |
| 985,423 | * | 2/1911 | Lahr ........................................ 43/114 |
| 1,117,284 | * | 11/1914 | Wagner et al. ......................... 43/114 |
| 1,166,709 | * | 1/1916 | Myers ..................................... 43/114 |
| 1,185,055 | * | 5/1916 | Burr et al. .............................. 43/114 |
| 1,655,128 | * | 1/1928 | Berghorn ................................ 43/114 |
| 1,983,251 | * | 12/1934 | Tongue ................................... 43/114 |
| 2,073,791 | * | 3/1937 | Graef ..................................... 43/114 |
| 4,425,733 | * | 1/1984 | Ammon et al. ........................ 43/115 |
| 5,253,448 | * | 10/1993 | Byom ..................................... 43/114 |
| 5,303,501 | * | 4/1994 | Seemann ................................ 43/114 |
| 5,383,301 | * | 1/1995 | Babb ...................................... 43/114 |

FOREIGN PATENT DOCUMENTS

| | | | |
|---|---|---|---|
| 51066 | * | 7/1911 | (AU) ...................................... 43/116 |
| 72600 | * | 4/1916 | (AU) ...................................... 43/116 |
| 381010 | * | 10/1964 | (CH) ...................................... 43/115 |
| 15420 | * | 7/1899 | (GB) ...................................... 43/114 |
| 613603 | * | 3/1909 | (GB) ...................................... 43/116 |
| 25918 | * | 4/1913 | (GB) ...................................... 43/116 |
| 246083 | * | 1/1926 | (GB) ...................................... 43/115 |

OTHER PUBLICATIONS

Popular Science Monthly, "Colored Fly Paper Attracts Insects", p. 19, Feb. 1938.*

* cited by examiner

Primary Examiner—Michael J. Carone
Assistant Examiner—Frederick French
(74) Attorney, Agent, or Firm—Bernard Malina; Malina & Wolson

(57) ABSTRACT

A trap for airborne insects is provided including a scroll tube with left and right caps on respective ends of the bar, a support wire connecting the left and right ends, a flexible web rolled around the scroll tube and coated with a tacky adhesive, and a cylinder of sufficient size to allow storage therein of the scroll tube. Upon assembly, the scroll tube is removed from within the cylinder. A portion of the web is unravelled from the scroll tube and wound around the cylinder exposing therebetween an area of web for catching flies and other insects. Periodically, the web can be refreshed by winding a previously exposed web section around the take-up cylinder.

15 Claims, 4 Drawing Sheets

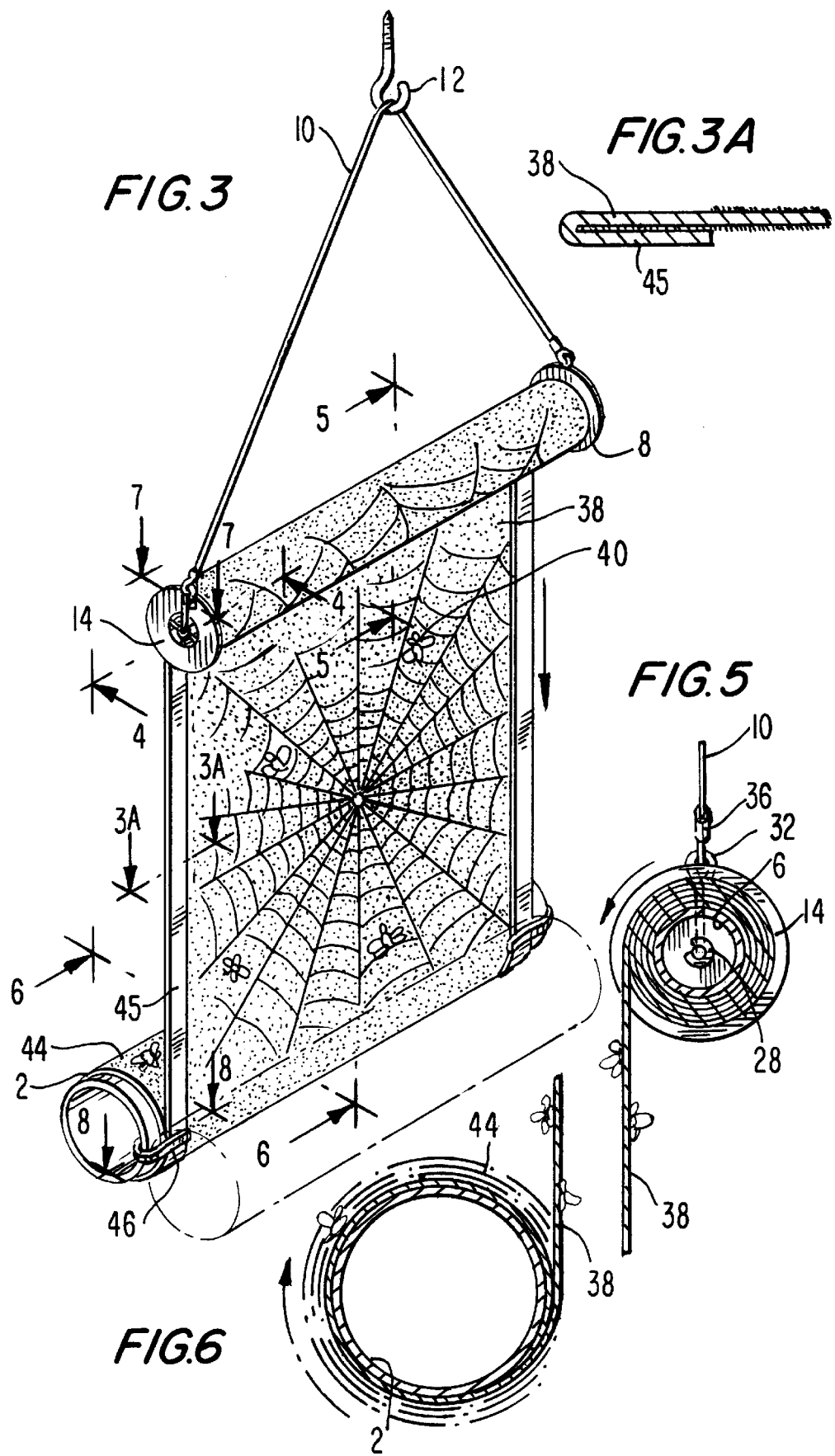

INSECT TRAP

RELATED APPLICATIONS

This application claims priority of Provisional Application No. 60/059,410 filed Sep. 19, 1997.

BACKGROUND OF THE INVENTION

1. Field of the Invention

The invention relates to an insect trap for eliminating insects, particularly flying insects which have invaded indoor premises.

2. The Related Art

Indoor pests, especially of the flying insect variety, traditionally have been controlled by the use of "fly paper."

A typical fly paper includes first and second ends respectively attached to opposite sides of an elongated strip having both of its major surfaces coated with a highly sticky adhesive. The first end generally has a loop for attachment to an overhead fixture or a thumb tack for support of the paper against a ceiling area.

There are a number of technical deficiencies with the common fly paper trap. First, the area of ordinary fly paper is relatively small. Large infestations of insects are not completely captured by such product. Another problem with typical fly paper is the need for replacement at regular intervals with resulting inconvenience. Replacement usually entails procuring a ladder and climbing thereon to reach and release the attached end of the fly trap. Still a further problem with the traditional product is disposal. Elongated sticky paper has a tendency to curl. During disposal, movement of the paper can lead to undesired sticking against walls and other surfaces.

Accordingly, it is an object of the present invention to provide a trap for flying insects which has a higher trapping capacity than those previously known.

Another object of the present invention is to provide a trap for flying insects which is easier to install and less messy to remove.

Still another object of the present invention is to provide a trap for flying insects which allows for exposure of a fresh length of adhesive simply by advancing a length of fly paper from a scroll to a take-up tube.

These and other objects will become more readily apparent from the summary and detailed description.

SUMMARY OF THE INVENTION

A trap for airborne insects is provided which includes:

(i) a scroll tube with left and right caps at respective left and right ends of the scroll tube;

(ii) a suspension support connected to the left and right ends of the scroll tube, the suspension support being of a sufficient length to be secured to a mount for supporting the suspension support and thereby supporting the trap;

(iii) a web of flexible substrate with first and second ends, the web being coated with a tacky adhesive on at least one surface, the first end of the web being attached to the scroll tube and rolled around the scroll tube; and (iv) a tubular cylinder sized to receive the scroll tube when inserted therein, the second end of the web engaging the tubular cylinder in a manner to allow roll-up of the web onto the tubular cylinder.

Support wire according to the present invention encompasses not only metal strands (both flexible and rigid) but also, without limitation, natural and synthetic polymers. These include cellulosic cord, polyester, rayon, polyamide, polyethylene, polypropylene and combination fibers.

A clip or equivalent attachment device joins the cylinder on at least one of its respective left and right ends to the second end of the web. The clip may be a paper clip, spring-loaded clip, or hair clip. Other suitable connectors may be Velcro® or an adhesive strip.

Advantageously, the web will be printed with graphics. Preferably, these graphics should be insect attractant. For instance, the likeness of flies may be printed on the web.

Certain colors, specially fluorescent colors such as fluorescent chartreuse, are preferred because of their attractant properties. For additional visual cues to flying insects, a spider web may be drawn on the flexible substrate. Typical materials of construction for the flexible substrate include woven and non-woven textiles such as rayon, polyester and mixtures thereof. Most preferred is a purely cellulosic material such as high strength paper.

Maximum efficiency is achieved by coating both major surfaces of the web with adhesive. Synthetic or natural adhesives may be employed. Typical natural adhesives include starches and modified starches. Synthetic adhesives include polyacrylates, polyvinylchlorides, silicones, urethanes, styrene, copolymers (e.g., SIS, SBS) and polyvinylacetate. These adhesives preferably have a melting temperature substantially above the maximum ambient temperature, e.g. 150° F., yet should remain tacky down to freezing temperatures. The thickness of the adhesive coating may range between 0.02 to 0.5 inches.

The web may have a width ranging from about two inches to about twenty-four inches, preferably between about four and about twelve inches. In length, the web ranges preferably from about one to about forty feet, optimally from about three to about thirty feet. In a preferred embodiment, the free end of the web which is attached to the take-up cylinder has an adhesive-free section of approximately 1 to approximately 3 feet along the length of the web. The subsequent 20 to 30 feet of the remaining web is coated on both surfaces with adhesive.

The scroll tube and cylinder are preferably arranged to be on opposite sides of a plane defined by a major surface of the web.

The left and right caps flanking the scroll tube should include an aperture. The support wire can attach to the scroll tube by passage through both left and right apertures. The support wire may, however, be attached in an alternative manner as described below.

Each of the caps may include a circular disk surrounding the aperture and a cylindrical foot perpendicular to the disk. The foot has a smaller diameter than the diameter of the disk. The foot serves to anchor the cap within a hollow area of the cylinder. The cap further includes an L-shaped connector, one arm of the connector being rotatably held within the aperture and another arm being positioned flush against an outer surface of the disk. Alternative anchor arrangements may simply be a crimped or fisherman knot to tie the end of the foot or the support wire to the cap. A detent protruding from a surface of the disk is employed as a stop mechanism against gravity induced rotational movement of the L-shaped connector. Without the detent, the web would tend to unravel.

An eyelet is formed at an outer terminus of the L-shaped connector for joinder to an end of the support wire.

A pair of dust covers may be positioned over open opposite ends of the cylinder during storage of the scroll tube in the cylinder.

A major advantage of the trap according to the present invention is that there is no necessity for lodging the scroll tube/web/cylinder in any special housing or provide support pinions/racks or to connect same with an insert lure (e.g., fluorescent light). Neither is it necessary to supply electric energy to the system, crank levers, or to support the trap in any horizontal position thereby preventing its placement in critical areas, such as suspension from ceilings or walls.

DESCRIPTION OF THE DRAWING

The above features, advantages and objectives of the present invention will more fully be appreciated through the following detailed discussion, reference being made to the drawing in which:

FIG. 3 is a plan perspective view of the fly trap in its assembled form;

FIG. 3a is a cross-sectional view along line 3a—3a of FIG. 3;

FIG. 5 is a cross-sectional view through the scroll tube along line 5—5 of FIG. 3;

FIG. 6 is a cross-sectional view of the cylinder taken along line 6—6 of FIG. 3;

DETAILED DESCRIPTION OF THE INVENTION

Figure 1:
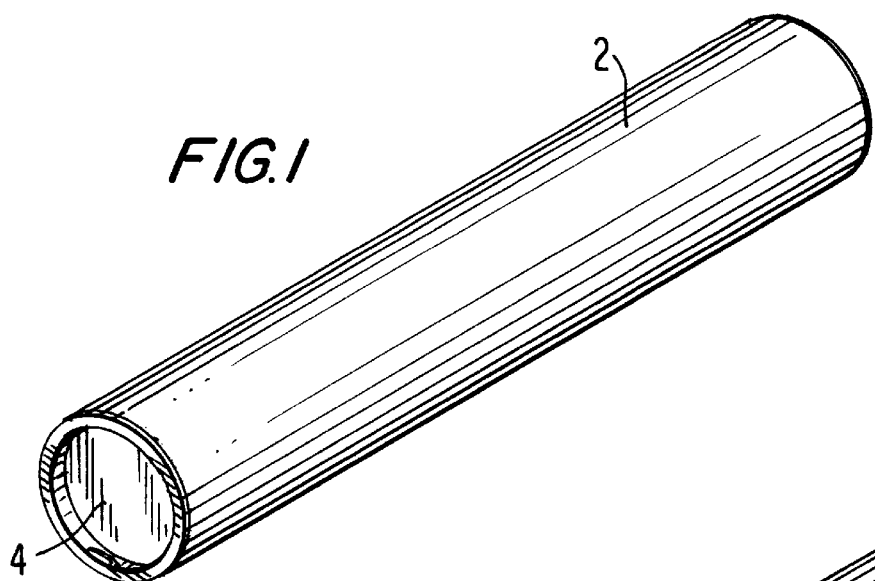
FIG. 1 is a plan perspective view of the fly trap in its pre-assembled package.
Figure 2:
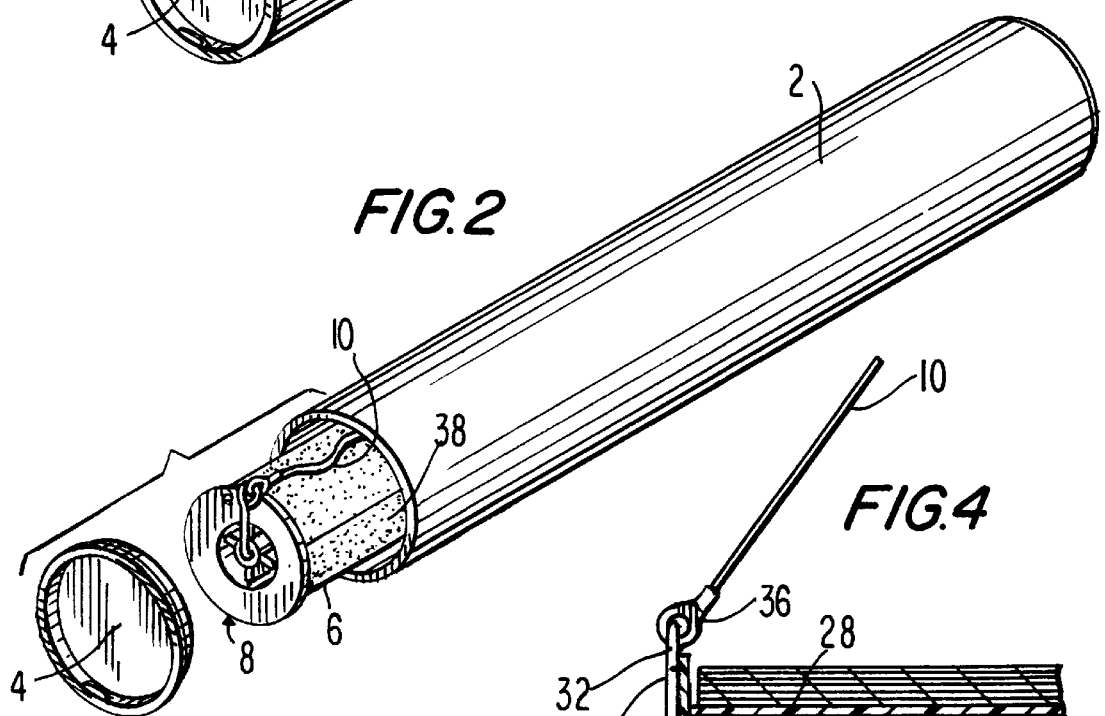
FIG. 2 is an exploded plan perspective view similar to FIG. 1 but also illustrating the scroll tube, wound web and support wire lodged within a cylinder.

The insect glue trap of the present invention is illustrated in FIG. 1 through its pre-assembled format. Tubular cylinder 2 serves as an outer packaging for the insect glue trap. A pair of covers 4 are positioned over open opposite ends of the cylinder. Assembly of the trap requires removal of the dust covers 4. As shown in FIG. 2, scroll tube 6 is removed from within the cylinder 2. Left and right ends of the scroll tube 6 are fitted with respective left and right caps 8.

FIG. 3 illustrates the fully assembled insect glue trap. A support wire 10 connects the left and right ends of the scroll tube 6. Support wire 10 must be of a sufficient length to be snared by an externally mounted hook 12 for supporting the line and thereby the trap.

Figure 4:
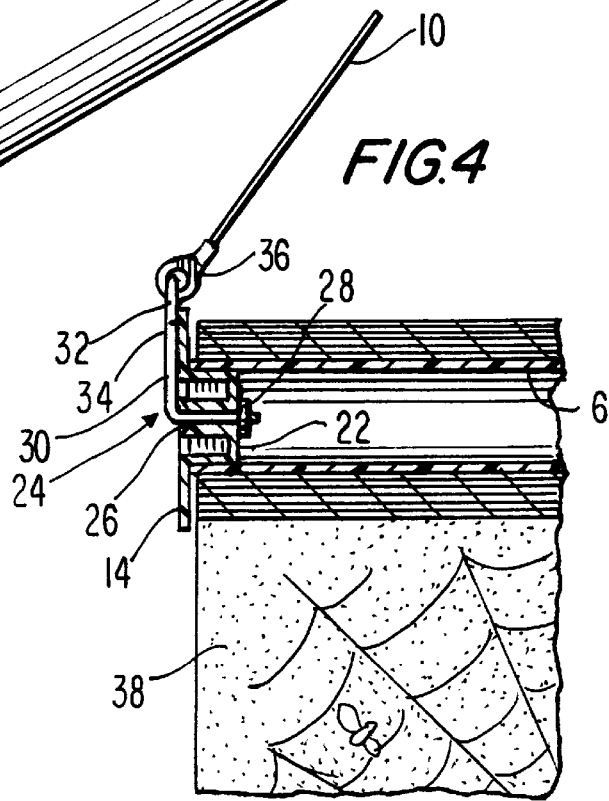
FIG. 4 is a partial cross-sectional view along line 4—4 of FIG. 3.
Figure 9:
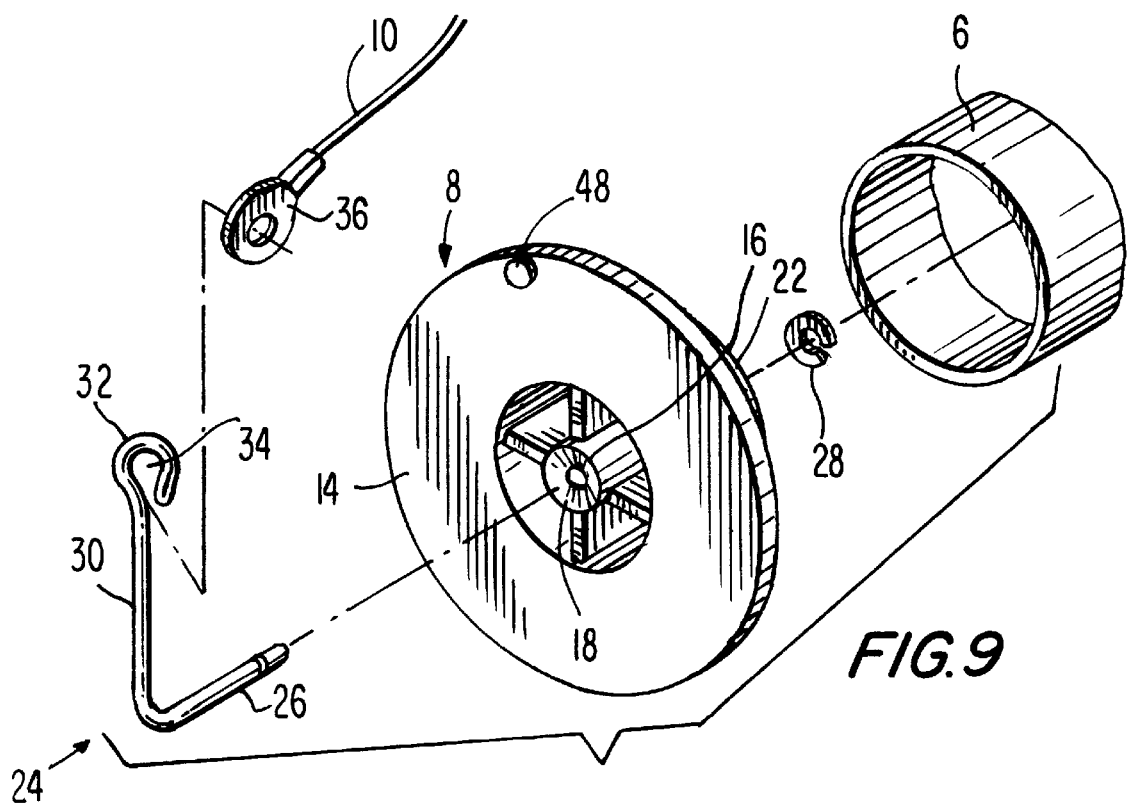
FIG. 9 is an exploded view of an end of the scroll tube, the cap, the L-shaped connector and terminus with eyelet of the support wire.

FIGS. 4 and 9 best illustrate the function and structure of left and right caps 8. Each of the caps is formed as a circular disk 14 surrounding an aperture 16, the latter being surrounded by a tapered funnel shaped mouth 18. A cylindrical foot 22 is perpendicular to the disk and protrudes inwardly toward a hollow area of cylinder 6. The cylindrical foot 22 has a smaller diameter than that of the disk and that diameter is only slightly smaller than the hollow area of cylinder 6 which through a press fit anchors the foot within the cylinder. Preferably the outer surface of foot 22 is fashioned with a series of ribs to improve action of the press fit and also prevent against any slippage rotation. By this arrangement, foot 22 also anchors cap 8 within the hollow of the cylinder.

Figure 4A:
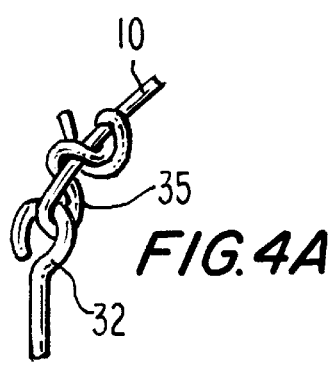
FIG. 4a is a partial view showing a fisherman knot alternative connection to the support wire.
Figure 7:
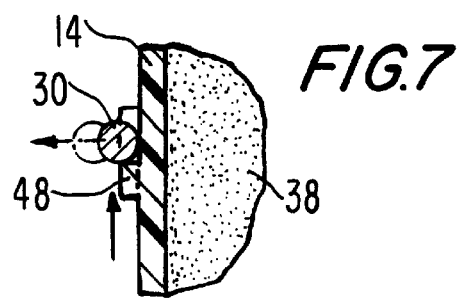
FIG. 7 is a partial cross-sectional view of the scroll tube taken along line 7—7 of FIG. 3 shown to illustrate the detent.

An L-shaped connector 24 has one arm 26 rotatably inserted within aperture 16 and protrudes through foot 22 being secured against outward axial movement by a clamp 28. A second arm 30 of the L-shaped connector is formed with an eyelet 32 at an outer terminus of the connector. Eyelet 32 has a passageway 34 which allows joinder to a catch 36 anchored to an end of the support wire 10. FIG. 4a illustrates an end of the support wire 10 tied to eyelet 32 through knot 35. The knot serves as an alternative to catch 36.

A web 38 formed from a relatively thick gauge paper is at one end attached to scroll tube 6 and, in its starting position, is completely wound around the scroll tube. The web 38 is approximately twelve inches wide and twenty-three feet long. The twenty-three feet closest to the scroll tube are coated with a sticky adhesive on both sides of the web. In some embodiments, coating need only be placed on one side of the web. Graphics on the web include decoy flying insects 40. Approximately three feet of the terminal length of the web opposite the first end is a section of non-adhesively treated web 44 which is wrapped around an outer surface of cylinder 2 for sufficient revolutions until an area of the adhesively coated web seals against the uncoated web area 44.

FIG. 3a best illustrates a non-adhesive border 45 placed along left and right margins of the web.

Figure 8:
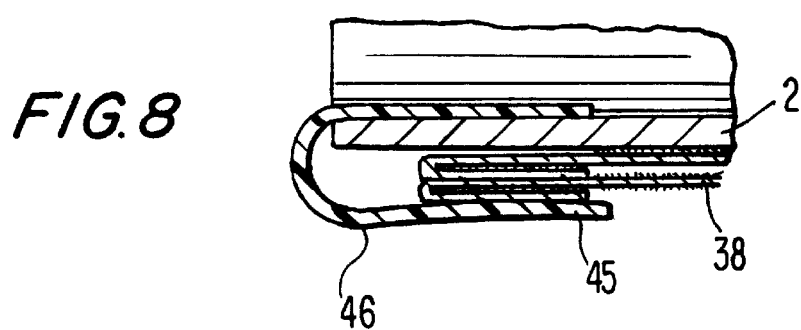
FIG. 8 is a view of the clip arrangement securing the web to the cylinder taken along line 8—8 of FIG. 3 and shown in enlarged partial view.

Further insurance against unraveling is provided by a clip 46 best viewed in FIG. 8. The clip snugly holds web 38 in position against cylinder 2. Clip 46 avoids becoming sticky and messy by resting over the non-adhesive border 45.

When further freshly adhesive areas of the web are required, exposed portions with trapped insects are wound around cylinder 2 by pulling downward on the web 38 and uncontrolled release is prevented by a detent 48 protruding from a surface of disk 14. The detent functions to stop gravity induced rotational movement of the L-shaped connector arm 30. Of course, the detent 48 can be overridden by an applied human force whenever the web requires unscrolling.

Figure 10:
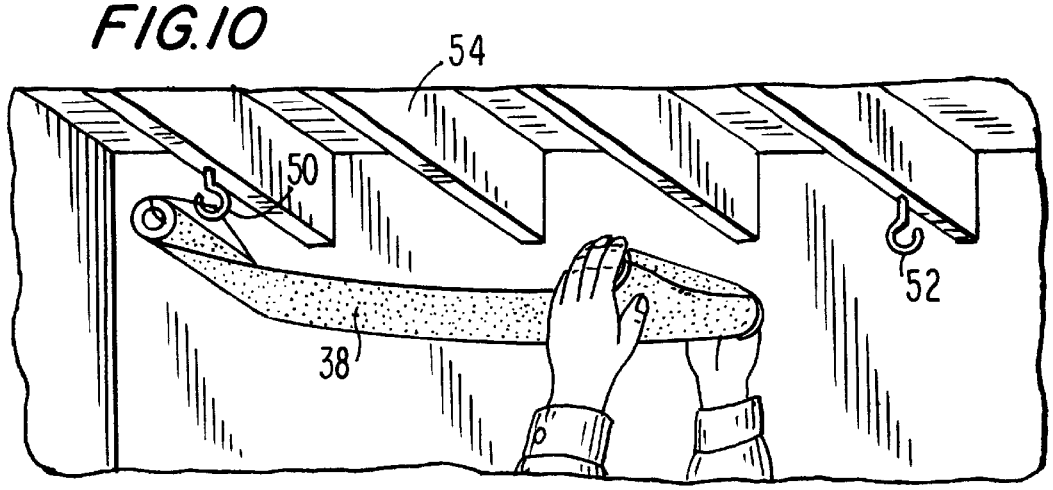
FIGS. 10–12 are views showing the mounting the trap in horizontal arrangements along a ceiling area.
Figure 11:
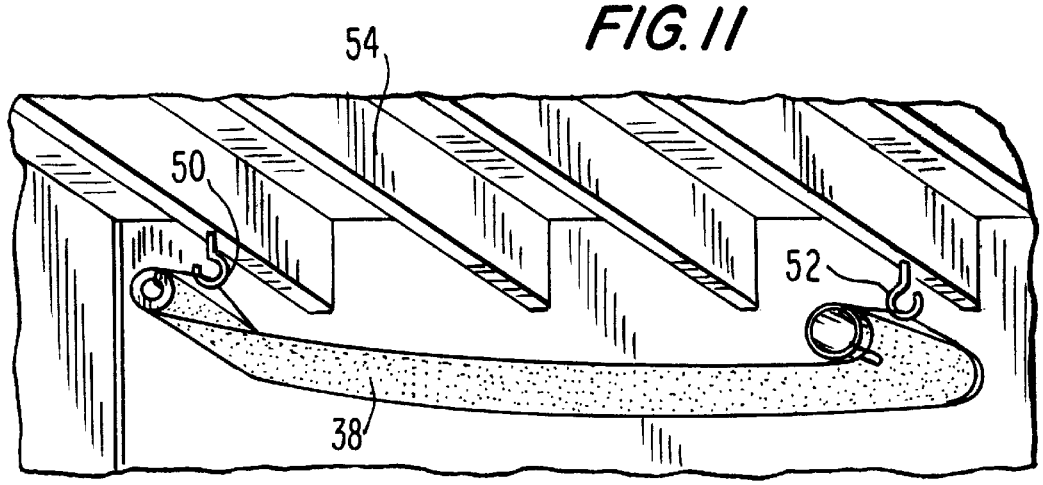
Figure 12:
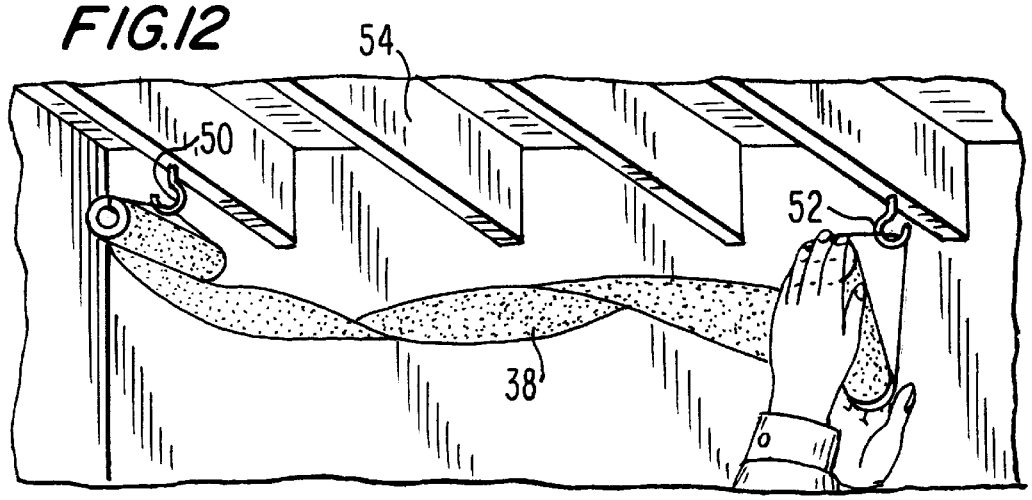

The insect glue trap of the present invention easily unrolls to be suspended vertically or horizontally. FIGS. 10 and 11 illustrate a horizontal placement across hooks 50, 52 from ceiling 54. A twisted web configuration may also be deployed as illustrated in FIG. 12. The insect glue in the configuration shown in FIG. 3 and especially those of FIGS. 11 and 13, may be used typically in dairy barns, chicken coops, sheep and hog enclosures, garbage rooms, and greenhouses, or wherever flies and other airborne insects are present in large numbers.

Assembly of the trap into the operative condition merely requires removing the scroll tube 6 from within the tubular cylinder 2. The empty cylinder 2 is then placed at the bottom of the insect glue trap web 38. The end of the web 38 is held against the cylinder 2 while performing four or five complete turns until the glue is fully exposed on both sides of the web paper. Thereafter, from one to three feet, or even the entire length of the web 38 is pulled down from the scroll tube 6. Clips 46 are then slipped onto both sides of the cylinder 2 at a tangent where the sticky paper of web 38 meets the taped-up cylinder 2. When the exposed portion of web 38 is full of flies, the clips 46 are removed and the exposed portion of web 38 is simply wound up to expose a fresh web surface. The clips 46 are then relocated to encompass the new windings around the cylinder 2. When all of the web has thus been completely deployed, the last portion of the coated web carrying trapped insects is wound up over the previously exposed wound web portions carrying trapped insects and the system is in the final condition ready for disposal. In this final condition, the trapped, i.e., dead insects are stored and concealed tightly between the tightly wound layers of previously exposed adhesive coated paper. In this condition, the dead insects are deeply and securely encased, thereby preventing exposure of the insect bodies and dissemination of potential pathogenic organisms to the surrounding atmosphere. If desired, the trap in the final condition may be easily placed in a bag for disposal in a convenient and sanitary fashion.

The invention has been described with reference to a preferred embodiment. Modifications and alterations can occur to others upon reading and understanding the specification. It is intended to include all such modifications and alterations insofar as they come within the scope of the appended claims or the equivalents thereof.

What is claimed is:

1. A trap for airborne insects comprising:
    a scroll tube with left and right caps at respective left and right ends of the scroll rube;
    a suspension support connected to left and right ends of the scroll tube, the suspension support being of a sufficient length to be secured to a mount for supporting the suspension support and thereby supporting the trap;
    a web of flexible substrate with first and second ends, the web being coated with a tacky adhesive on at least one surface, the first end of the web being attached to the scroll tube and rolled around the scroll tube;
    a tubular cylinder; and
    wherein the second end of the web is attached to the tubular cylinder, the left and right caps include an aperture, each cap comprises a circular disk surrounding the aperture and a cylindrical foot perpendicular to the disk and of a smaller diameter than a diameter of the disk, the foot anchoring the cap within a hollow area of the cylinder.

2. The trap according to claim 1 wherein said suspension support comprises a support wire.

3. The trap according to claim 1 further comprising a clip at left and right ends of the cylinder for joining the second end of the web to the cylinder.

4. The trap according to claim 1 wherein the web is printed with graphics.

5. The trap according to claim 3 wherein the graphics illustrate at least one insect.

6. The trap according to claim 4 wherein the graphics illustrate a spider web.

7. The trap according to claim 1 wherein the web is yellow in color.

8. The trap according to claim 1 wherein the scroll tube and cylinder are positioned on opposite sides of a plane defined by a major surface of the web.

9. The trap according to claim 1 wherein the cap further comprises an L-shaped connector, one arm of the connector rotatably held within the aperture and another arm lying flush against an outer surface of the disk.

10. The trap according to claim 9 further comprising a detent protruding from a surface of the disk, the detent functioning to stop gravity-induced rotational movement of the L-shaped connector.

11. The trap according to claim 10 further comprising an eyelet at an outer terminus of the L-shaped connector for joinder to an end of the support wire.

12. The trap according to claim 1 wherein the suspension support and web are packaged inside the tubular cylinder prior to assembly into the trap.

13. The trap according to claim 12 further comprising a pair of dust covers positioned over open opposite ends of the cylinder during storage of the scroll tube within the cylinder.

14. A trap for airborne insects comprising:
    a scroll tube with left and right caps at respective left and right ends of the scroll tube;
    a suspension support connected to left and right ends of the scroll tube, the suspension support being of a sufficient length to be secured to a mount for supporting the suspension support and thereby supporting the trap;
    a web of flexible substrate with first and second ends, the web being coated with a tacky adhesive on at least one surface, the first end of the web being attached to the scroll tube and rolled around the scroll tube;
    a tubular cylinder sized to receive the scroll tube when inserted therein, the second end of the web adaptable to engage the tubular cylinder in a manner to allow the web to be wound up onto the tubular cylinder; and
    a clip at left and right ends of the cylinder for joining the second end of the web to the cylinder.

15. A method for trapping airborne insects comprising:
    providing a trap which comprises:
        a scroll tube with left and right caps at respective left and rights ends of the scroll tube;
        a suspension support connected to left and right ends of the scroll tube, the suspension support being of a sufficient length to be secured to a mount for supporting the suspension support and thereby supporting the trap;
        a web of flexible substrate with first and second ends, the web being coated with a tacky adhesive on at least one surface, the first end of the web being attached to the scroll tube and rolled around the scroll tube; and
        a tubular cylinder sized to receive the scroll tube when inserted therein, the second end of the web adaptable to engage the tubular cylinder in a manner to allow the web to be wound up onto the tubular cylinder; and
    removing the scroll tube from within the tubular cylinder; and
    attaching the second end of the scroll tube to the tubular cylinder.

* * * * *